US012430158B2

(12) United States Patent
Paulraj et al.

(10) Patent No.: US 12,430,158 B2
(45) Date of Patent: Sep. 30, 2025

(54) METHOD, SYSTEM AND DOMAIN FOR PROVIDING A SECURITY EXECUTION ENVIRONMENT FOR SECURITY-RELEVANT APPLICATIONS

(71) Applicant: Robert Bosch GmbH, Stuttgart (DE)

(72) Inventors: Balakrishnan Paulraj, Sindelfingen (DE); Achim Schaefer, Grossbottwar (DE); Arup Mukherji, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 611 days.

(21) Appl. No.: 17/656,547

(22) Filed: Mar. 25, 2022

(65) Prior Publication Data

US 2022/0318046 A1    Oct. 6, 2022

(30) Foreign Application Priority Data

Apr. 1, 2021 (DE) ............... 10 2021 203 323.7

(51) Int. Cl.
*G06F 9/455* (2018.01)
*B60R 16/023* (2006.01)

(52) U.S. Cl.
CPC ...... *G06F 9/45558* (2013.01); *B60R 16/0231* (2013.01); *G06F 2009/45587* (2013.01)

(58) Field of Classification Search
CPC ...... G06F 9/45558; G06F 21/53; G06F 21/57; G06F 2009/45587
See application file for complete search history.

(56) References Cited

U.S. PATENT DOCUMENTS

| | | | | |
|---|---|---|---|---|
| 2005/0108521 A1* | 5/2005 | Silhavy | ............... | G06F 21/6227 713/156 |
| 2006/0200820 A1* | 9/2006 | Cherkasova | ........ | G06F 11/3423 718/1 |
| 2006/0206300 A1* | 9/2006 | Garg | ................... | G06F 9/45537 703/27 |
| 2007/0073916 A1* | 3/2007 | Rothman | .............. | G06F 21/575 710/14 |
| 2009/0165081 A1* | 6/2009 | Zhang | ................. | G06F 21/6218 726/1 |
| 2010/0107246 A1* | 4/2010 | Ohta | ........................ | G06F 21/74 726/22 |
| 2012/0317569 A1* | 12/2012 | Payne, Jr. | ............... | G06F 21/53 718/1 |
| 2014/0258708 A1* | 9/2014 | Shekhar | .............. | H04L 63/0428 713/155 |
| 2016/0359890 A1* | 12/2016 | Deen | ....................... | H04L 63/06 |
| 2017/0149880 A1* | 5/2017 | Lochhead | ........... | H04L 41/0895 |
| 2018/0096678 A1* | 4/2018 | Zhou | ...................... | G10L 15/08 |
| 2019/0028920 A1* | 1/2019 | Pan | ......................... | H04L 47/24 |
| 2019/0190892 A1* | 6/2019 | Menachem | ........... | G06F 21/602 |

(Continued)

FOREIGN PATENT DOCUMENTS

DE      102015210371 A1    12/2016
DE      102020132078 A1     7/2021

(Continued)

*Primary Examiner* — Tuan C Dao
(74) *Attorney, Agent, or Firm* — NORTON ROSE FULBRIGHT US LLP

(57) ABSTRACT

A system, security domain and method for providing a security execution environment for security-relevant, domain-specific applications in a virtualized system.

12 Claims, 2 Drawing Sheets

(56) References Cited

U.S. PATENT DOCUMENTS

| | | | |
|---|---|---|---|
| 2019/0268420 A1* | 8/2019 | Acharya | H04L 63/166 |
| 2021/0133123 A1* | 5/2021 | Feehrer | G06F 12/0607 |
| 2022/0135075 A1* | 5/2022 | Ng | G06V 20/56 |
| | | | 701/301 |
| 2022/0144304 A1* | 5/2022 | Ehsanibenafati | G06V 20/588 |

FOREIGN PATENT DOCUMENTS

| | | |
|---|---|---|
| EP | 3595256 A1 | 1/2020 |
| WO | 2018046345 A1 | 3/2018 |

* cited by examiner

METHOD, SYSTEM AND DOMAIN FOR PROVIDING A SECURITY EXECUTION ENVIRONMENT FOR SECURITY-RELEVANT APPLICATIONS

FIELD

The present invention relates to a method, to a system and to a domain for providing a security execution environment for security-relevant applications.

BACKGROUND INFORMATION

Security enhancements, for example, of POSIX-based systems are conventional in the related art, which are typically based on a specific TEE, Trusted Execution Environment. The TEE is based, for example, on hardware enhancements of a one-chip system, System on Chip (SoC), or of a microprocessor core. The TEE is provided as a highly privileged execution mode at the core level, which is even above the level of the operating system or of the hypervisor.

Existing TEE software implementations do not ensure any functional security. This is acceptable for consumer devices such as, for example, smartphones, since in the latter, manipulation security is paramount. These devices are not required to meet any high demands with respect to functional security. In a system required to meet high demands with respect to functional security, this non-functionally secure security environment, which runs at the highest privilege level and which controls the HW resources, violates these objectives. There are some enhancements that introduce some operating system-/scheduling mechanisms into this TEE domain (in order to enable the integration of third-party providers, etc., for example, based on the ARM trust zone), here too, however, the focus is more on questions of security and isolation than on safety. Particularly since the main TEE framework (including the OS capabilities for isolation) for these systems is also not security-qualified.

Current TEE systems have a very limited range of application for multi-domain systems with high demands placed on the functional security. They have either full control over the SoC, but support no security objectives, or run within a single domain and offer no security interfaces for other domains.

SUMMARY

One specific example embodiment of the present invention relates to a method for providing a security execution environment for security-relevant domain-specific applications in a virtualized system, in which at least two virtual machines share a hardware level virtualized with the aid of a hypervisor, a middleware level being provided between the hardware level and the application level, the middleware level being configured to provide the security execution environment for executing at least one security-relevant domain-specific application of a security domain and at least one further execution environment for executing at least one further domain-specific application of one further domain, the security domain being configured to meet safety requirements and security requirements.

A domain refers to a particular area of a total functionality, which is provided by the virtualized system. The area includes the parts of the system that are necessary for executing the domain-specific applications. For example, a domain may include one or multiple control units and the data lines connecting them.

The security domain includes security-relevant domain-specific applications. Further domains are, for example, quality-relevant, QM domains, communication domains, etc.

Security is understood to mean, in particular, manipulation security, for example, a safeguard against attacks from the outside, in particular cryptographic attacks and side channel attacks.

Safety is understood to mean a functional safety. For applications in the automotive industry, the functional safety is established, for example, based on the risk classification scheme ASIL, which is defined in the Standard ISO 26262— Functional safety for road vehicles. The standard defines the four ASIL levels A through D. ASIL D writes the highest integrity requirement on the product before ASIL A the lowest.

Thus, it is provided to set up a separate security domain, which meets both safety requirements as well as security requirements. Security-relevant applications thus no longer have to be integrated into the TEE with the highest privilege, the TEE meeting, in particular, only security requirements but no safety requirements.

Compared to the hardware/software TEE from the related art, the separate security domain has the following advantages: In the security domain, there are no dependencies of open source software such as, for example, ARM trusted firmware and thus no OSS maintenance. The security domain is separate from an underlying operating system and hypervisor support. Thus, there is less porting effort and higher flexibility in the selection of operating system and/or hypervisor provider. A key memory is already part of a specific secure hardware element on the hardware platform. Thus, there are no advantages in using a TEE in order to store keys there.

The security-relevant processes of the security domain and the associated POSIX processes are advantageously planned in this domain like any other process. A switch to a specific hardware TEE level, in particular, is not required. Thus, performance overhead and latency may be reduced and security requirements and real-time requirements may be met.

The system in accordance with the present invention is designed to host various types of execution environments on different combinations of the underlying hardware. For example, (cross-) domain ECUs, zone ECUs, vehicle gateway ECUs or a domain controller, which functions as a slave of the vehicle gateway ECUs, may be used as a basis for a vehicle computer.

According to one specific example embodiment of the present invention, it is provided that a temporal execution of processes and/or of tasks of the security domain is/are planned, in particular, with the aid of scheduling. This takes place, for example, with the aid of a, in particular, flexible resource-conscious scheduler for planning processes and/or tasks for execution by the security domain. In this way, runtime guarantees, for example, may also be advantageously provided, and security specifications and real-time specifications, in particular, with reference to functional security, may be met. Processes and tasks include the processes and tasks of the security-relevant, domain-specific applications and the associated operating system-related, in particular, POSIX OS, processes of the security domain.

According to one specific example embodiment of the present invention, it is provided that a planning of a temporal execution of security-relevant tasks and/or security-relevant processes of the security domain take(s) place in a task-based and/or process-based manner. The scheduling advantageously takes place in such a way that an asynchronous execution of security-relevant tasks and/or security-relevant processes is possible. In this way, the real-time response capability and thus the meeting of safety requirements and/or security requirements may be improved. The scheduling at the process level and/or task level of the security execution environment enables a flexible use with respect to safety requirements and security requirements.

This security domain implements means, which may be used for supporting the entire middleware level. These means include, for example, access to centralized security mechanisms of the security domain. The access may, for example, be controlled by the further domains. The security mechanisms include, for example, keys, certificates, as well as domain-wide, in particular, secure communication means and messaging means.

Moreover, the security domain may be integrated into the entire security environment of the platform and, for example, provide secure booting, also known as root of trust, and/or secure update possibilities.

According to one specific example embodiment of the present invention, it is provided that the security domain accesses both security-related hardware resources as well as non-security-related, in particular, performance-related, hardware resources of the hardware level.

Security-related hardware resources include privileged hardware resources, in particular, including different privilege levels, in particular, at least one highest privilege level. Privileged hardware resources are, for example, key memories, random number generators and other cryptographic elements.

Non-security-related, in particular, performance-related hardware resources include hardware resources, which are configured to meet non-security-critical real-time requirements and/or non-security-critical deterministic requirements. Non-security-related, in particular, performance-related, hardware resources are, for example, CPU timers, watchdog timers.

As a result of the access to security-related and non-security-related hardware resources, in particular, however, also of a shared and coordinated use of computing resources and memory resources, the security domain meets both requirements with respect to security as well as requirements with respect to safety.

As a result of the access of the security domain to security-related hardware resources and to non-security-related, in particular, performance-related, hardware resources, a switch to a specific hardware TEE level, in particular, is unnecessary. Thus, performance overhead and latency may be reduced.

The security domain may be provided to the system in different ways, in particular, as a function of specific hardware of the hardware level and/or of specific safety requirements and/or security requirements.

According to one specific example embodiment of the present invention, it is provided that the security domain is operated on a separate hardware platform of the hardware level, in particular, on a separate hardware chip. This separate hardware platform is, for example, a hardware security module (HSM), an internal or external peripheral device, in particular, for an efficient and secure execution of cryptographic operations or applications. In this way, highest security requirements but at the same time also safety requirements may be met.

According to one specific example embodiment of the present invention, it is provided that the security domain is operated on a separate hardware unit of a hardware platform of the hardware level, a further domain being operated on a further hardware unit of the hardware platform. The security domain is provided connected to a particular, separate hardware unit, for example, to a CPU core, with a direct connection to security-related hardware resources.

According to one specific example embodiment of the present invention, it is provided that the security domain is operated on a hardware unit of a hardware platform of the hardware level, and a further domain is operated on the same hardware unit of the hardware platform. The security domain is provided connected to a particular hardware unit, for example, to a CPU core, which is utilized together with a further domain. This specific embodiment is, for example, advantageous in a limited number of available hardware units, in particular, CPU cores, and in the case of lower security requirements.

It may prove to be advantageous for the security domain to be provided together with at least one further domain. It may be suitable, for example, to combine the security domain with a housekeeping domain. A housekeeping domain includes applications for managing the hardware platform. The security domain may, however, also be combined with other, in particular, relevant domains. The provision of the security domain together with at least one further domain is suitable, in particular, in systems that include a limited number of available hardware units, in particular, CPU cores.

Further specific example embodiments of the present invention relate to the software architecture of a security domain. Accordingly, a security domain includes an operating system, in particular, running in a hypervisor cell, the operating system providing interfaces for the hardware of a hardware level virtualized with the aid of the hypervisor, drivers for security-relevant applications of the security domain and drivers for domain-wide applications. Core functionalities of the security-relevant applications of the security domain are, for example, crypto-backend or key management. Core functionalities of the domain-wide applications are, for example, coordination mechanisms.

Further specific example embodiments of the present invention relate to a system, in particular, a control system, in particular, for a motor vehicle, for providing execution environments for domain-specific applications, including a virtualized system, in which a plurality of virtual machines share at least one hardware level virtualized with the aid of a hypervisor, a middleware level being provided between the hardware platform and the application level, the middleware level further being configured to provide the security execution environment for executing at least one security-relevant, domain-specific application according to the specific embodiments of a security domain according to the specific embodiments and for providing at least one further execution environment for executing at least one further domain-specific application of a further domain.

According to one specific example embodiment of the present invention, it is provided that the security domain and/or the at least one further domain include(s) interfaces for domain-wide communication.

The system is or includes, for example, a control unit, in particular, for a motor vehicle, in particular, a vehicle computer, (cross-)domain ECUs, zone ECUs, vehicle gateway ECUs or domain controller, which functions as a slave of the vehicle gateway ECU.

This description describes how a security domain may be integrated into a, in particular, POSIX-based system that includes high safety requirements and high security requirements, and how such a security domain may be handled in a multi-domain, in particular, multi-hardware, runtime environment. These aspects are of great importance for control units, in particular, for centralized vehicle computers or domain computers, which serve as an integration platform that includes high security requirements.

Further features, possible applications and advantages of the present invention result from the following description of exemplary embodiments of the present invention, which are represented in the figures. All features described or represented in this case, alone or in arbitrary combination, form the subject matter of the present invention, regardless of their wording or representation in the description or in the figures.

DETAILED DESCRIPTION OF EXAMPLE EMBODIMENTS

Figure 1:
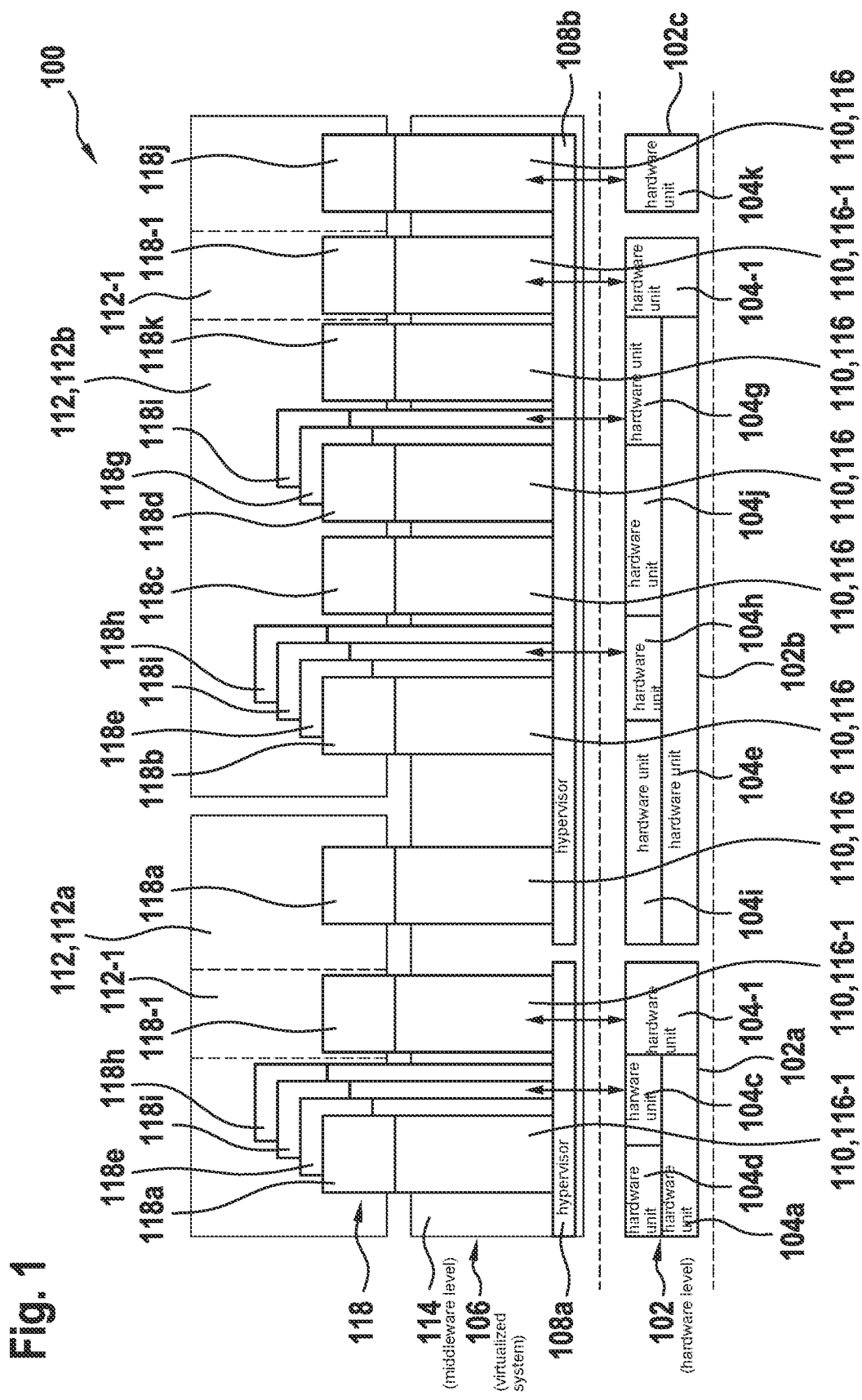
FIG. 1 schematically shows an overview of a system according to one exemplary specific embodiment of the present invention.

FIG. 1 shows a system 100, in particular, a control system, in particular, for a motor vehicle.

According to the specific embodiment shown, the system includes three hardware platforms 102a, 102b, 102c, which form a hardware level 102.

Hardware platform 102a includes four hardware units 104a, 104b, 104c, 104d. These are, for example, microcontroller 104a, secure hardware resources 104b, hardware routing chips 104c, and further hardware elements 104d.

Hardware platform 102b includes six hardware units 104e, 104f, 104g, 104h, 104i, 104j. These are, for example, microprocessor 104e, secure hardware resources 104f, hardware routing chips 104g, 104h and further hardware elements 104i, 104j.

Hardware platform 102c includes a hardware unit 104k, for example, a hardware accelerator.

System 100 further includes a virtualized system 106. Hypervisor 108a, 108b virtualizes hardware platforms 102a, 102b, 102c. Multiple virtual machines 110 share virtualized hardware platforms 102a, 102b, 102c.

A middleware level 114 is provided between hardware platforms 102a, 102b, 102c and an application level 112. Middleware level 114 provides multiple execution environments 116, which run on various hardware units 104 of hardware platforms 102a, 102b, 102c.

Application level 112 includes, in particular, classic applications 112a and applications including a service-oriented architecture (SOA), SOA applications 112b.

Execution environments 116 are configured to execute domain-specific applications 112 of a respective domain 118.

Execution environments 116 are configured to execute domain-specific applications 112 of a respective domain 118.

A respective domain 118 refers to a particular area of a total functionality, which is provided by system 100.

According to the specific embodiment shown, a security execution environment 116-1 is provided for executing at least one security-relevant, domain-specific application 112-1 of a security domain 118-1. Security domain 118-1 has access to both security-related hardware resources and to non-security-related, in particular, performance-related, hardware resources of the hardware level. Security domain 118-1 is, in particular, a trusted instance of the hardware platform and includes security-relevant applications and updates, in particular, executable on a classic or adaptive AUTOSAR execution environment.

According to the specific embodiment shown, the following further domains 118 are provided by way of example:

Safety domains, in particular, defined safety 118a and flexible safety 118b, measures of quality, QM domains, in particular, defined QM 118c and dynamic QM 118d.

The safety domain "defined safety" 118a includes, in particular, applications with requirements according to ASIL x and legacy software, in particular, with hard real-time and deterministic requirements, in particular, executable on a classic AUTOSAR execution environment.

The safety domain "flexible safety" 118b includes, in particular, service applications with requirements according to ASIL x having a service-oriented architecture, SOA, in particular, with soft real-time and limitedly deterministic requirements, in particular, executable on an adaptive AUTOSAR execution environment.

The QM domain "defined QM" 118c includes, in particular, feature-rich QM service applications, for example, executable on a Linux, for example, Linux GENIVI, execution environment.

The QM domain "dynamic QM" 118d includes, in particular, QM applications, for example, executable on a Linux, for example, Apertis Linux, execution environment.

Infrastructure domains including, in particular, housekeeping domains 118e, software (SW) management domains 118g.

Housekeeping domain 118e includes applications for managing the hardware platform, in particular, ASIL x relevant, with hard real-time and deterministic requirements, in particular, executable on a classic or adaptive AUTOSAR execution environment.

SW management domain 118g includes QM applications, in particular, the provision of control unit updates, in particular, executable on a classic or adaptive AUTOSAR or Linux execution environment.

Information domains including, in particular, input/output (I/O) domain 118h and communication domain 118i.

I/O domain 118h includes the management of analog and digital I/Os and the provision of I/Os for other domains, in particular, ASIL x relevant, in particular, executable on a classic or adaptive AUTOSAR execution environment.

Communication domain 118i includes the management of communication channels and protocols and the provision of the communication to other domains, in particular, QM relevant, in particular, executable on a classic or adaptive AUTOSAR or Linux execution environment.

Domains for further purposes, in particular, including HW accelerators, HWA domain 118j and further, in particular, customer-specific or project-specific domains 118k.

HWA domain 118j includes applications, which utilize hardware accelerators, in particular, GPU, FPGS, in particular, executable on an adaptive AUTOSAR or Linux execution environment.

Further, in particular, customer-specific or project-specific domains 118k include purely customer-specific applications, for example, Android.

The instantiation of domains 118 is a function of specific project design and the particular applications of system 100.

Normally, not all cited domains 118 need to be contained in each project. Moreover, it is also possible to combine individual domains 118, for example, housekeeping domain 118e and I/O domain 118h may be instantiated on the same virtual machine 110.

Middleware level 114 supports the use of domains 118 on different hardware units 104. In this case, respective execution environments 116 and/or hardware units 104 meet domain-specific requirements, in particular, real-time requirements and/or security requirements and/or system requirements and/or functional requirements of the respective domain-specific application 112 and/or domain 118.

Middleware level 114 implements software functionalities in order to manage and coordinate the different execution environments 116, implementations and used hardware units 104. Examples for these domain-wide/hardware-wide functions are state management, over-the-air-update functions, security services and expanded function-wide diagnoses.

According to the specific embodiment shown, it is provided that a security domain 118-1 is operated on separate hardware unit 104b of hardware platform 102a of the hardware level. One further security domain 118-1 is operated on separate hardware unit 104f of hardware platform 102b of hardware level 102. Further domains 118 are operated in each case on further hardware units of respective hardware platform 102a, 102b. Security domain 118-1 is provided bound to a particular, separate hardware unit, for example, to a CPU core, with a direct connection to security-related hardware resources.

Alternative specific embodiments not shown may include the security domain being operated on a separate hardware platform of the hardware level, in particular on a separate hardware chip. It may also be provided that the security domain is operated on a hardware unit of a hardware platform of the hardware level, and a further domain is operated on the same hardware unit of the hardware platform.

It may prove to be advantageous that the security domain is provided together with at least one further domain. It may be suitable, for example, to combine the security domain with a housekeeping domain. A housekeeping domain includes applications for managing the hardware platform. The security domain may, however, also be combined with other, in particular, relevant, domains. The provision of the security domain together with at least one further domain is suitable, in particular, in systems having a limited number of available hardware units, in particular, CPU cores.

Figure 2:
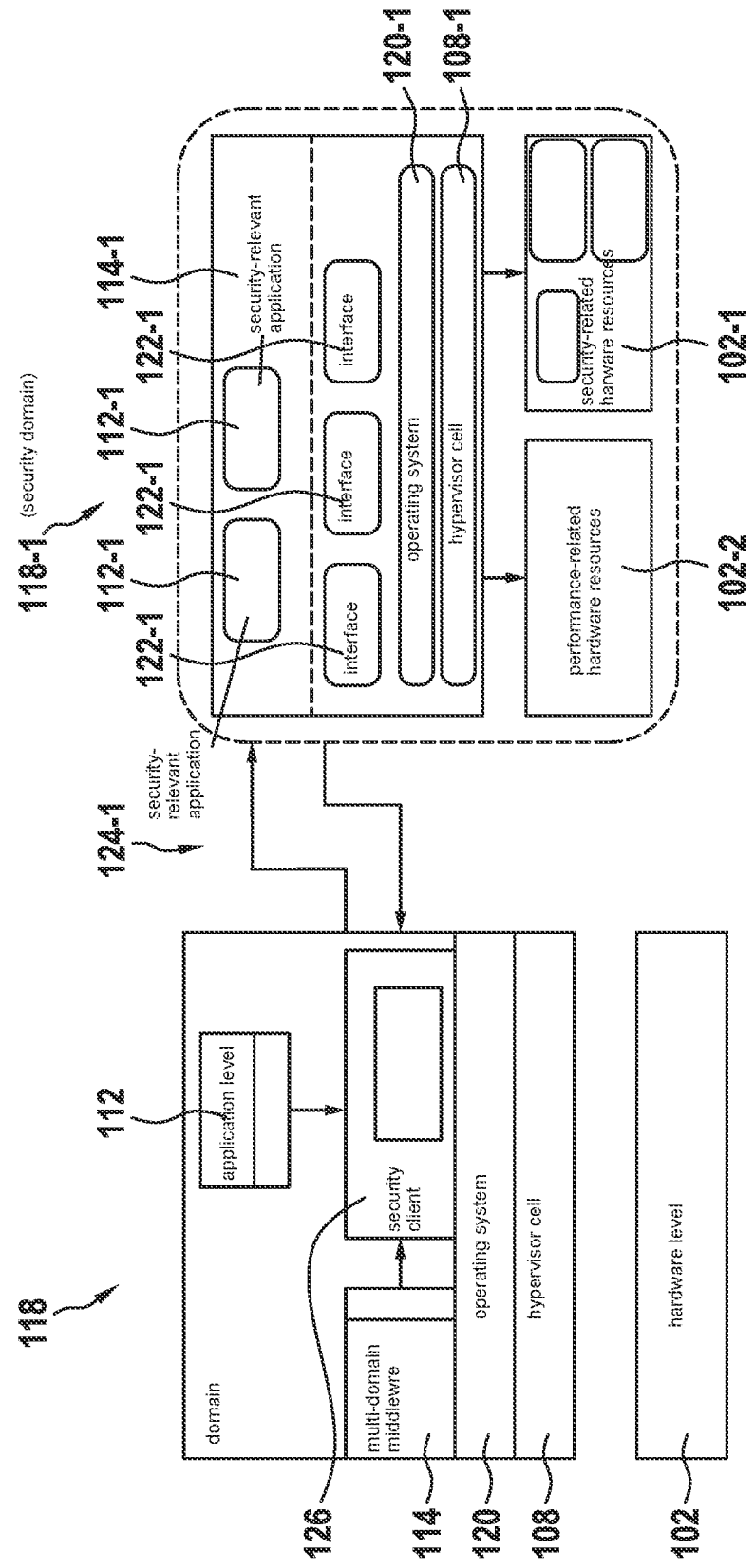
FIG. 2 schematically shows a representation of a software architecture of a security domain and of one further domain of the system from FIG. 1.

FIG. 2 schematically shows a representation of a software architecture of a security domain 118-1 and of a further domain 118 of the system from FIG. 1.

Security domain 118-1 includes an operating system 120-1, for example, POSIX-based, which runs, in particular, in a hypervisor cell 108-1. Operating system 120-1 provides interfaces to hardware resources of hardware level 102 virtualized with the aid of hypervisor 108.

Interfaces 122-1 include, for example, drivers for cryptographic primitives, in particular, asymmetrical cryptographic primitives, eFuse-drivers and crypto-drivers.

The hardware resources include security-related hardware resources 102-1, key memories, random number generators, hardware AES engine and non-security-related, in particular, performance-related, hardware resources 102-2 such as, for example, CPU cores, CPU timers, watchdog timers, eFuses.

The operating system or the middleware further provides drivers for security-relevant applications 112-1 of the security domain. Security-relevant applications include, for example, core functionalities such as crypto-backend and key management.

Operating system 120-1 or the middleware further provides interfaces 124-1 for domain-wide applications, in particular, domain-wide communication, in particular, synchronous or asynchronous coordination mechanisms.

A temporal execution of processes and/or tasks of security domain 118-1 is planned, for example, in particular, with the aid of scheduling. This takes place, for example, with the aid of, in particular, flexible resource-conscious, schedulers for planning processes and/or tasks for execution by security domain 118-1. In this way, runtime guarantees, for example, may advantageously also be provided, and security specifications and real-time specifications may be met. Processes and tasks include the processes and tasks of the security-relevant, domain-specific applications and the associated operating system-related, in particular, POSIX OS, processes of security domain 118-1. A planning of a temporal execution of security-relevant tasks and/or security-relevant processes of security domain 118-1 takes place, for example, in a task-based and/or process-based manner. The scheduling advantageously takes place in such a way that an asynchronous execution of security-relevant tasks and/or security-relevant processes is possible. In this way the real-time response capability and thus the meeting of safety requirements and/or security requirements is improved. The scheduling at the process and/or task level of the security execution environment enables a flexible use with respect to safety requirements and security requirements.

One further domain 118 is further represented in FIG. 2.

Domain 118 includes an operating system 120, for example, POSIX-based, which runs, in particular, in a hypervisor cell 108. Operating system 120 provides interfaces to hardware resources of hardware level 102 virtualized with the aid of hypervisor 108. The hardware resources include, for example, non-security-related, in particular, performance-related, hardware resources.

Domain 118 includes a security client 126, in particular, a proxy, for requesting security services. Security client 126 is adapted to the specific execution runtime environment. Runtime environments include, for example, classic/adaptive AUTOSAR, POSIX OS such as QNX, GHS, Linux. Security client 126 is connected to security domain 118-1 and provides it with the necessary services over secure communication channels. The scheduling of the security services within domains 118 is flexible and may thus support security requirements and real-time requirements. Asynchronous requests/responses are also supported, which is crucial in terms of real-time response capability and load balance of CPU cores. For security-relevant environments, the security service runs on a security-certified operating system, which ensures the scheduling and the freedom from interference at the process level.

The essential security logic is thus located within security domain 118-1. Further domains 118 request the security services of security domain 118-1.

Thus, according to the specific embodiment shown, security domain 118-1 implements means, which are required for supporting entire multi-domain middleware 114. These are the access to centralized security mechanisms belonging to security domain 118-1 and are requested by various further domains 118.

If security domain 118-1 is combined with other domains 118, for example, is integrated into a housekeeping domain, operating system 120, 120-1 and hypervisor layer 108, 108-1 are used only once. In this case, it must be ensured that security domain 118-1 is connected to a hardware trust basis, for example, for deriving keys from a secure hardware memory, in particular, HSM. The access to this root of trust is allowed only for the securing domain. This occurs via hardware mechanisms and hypervisor mechanisms and/or OS access control mechanisms.

Described system 100 and described security domain 118-1 may be used, in particular, in automotive control units, in particular, in centralized domain computers or vehicle computers, which serve as an integration platform for various types of applications. The focus may be on applications having, in particular, different, critical safety objectives and security objectives. Supported execution environments are, for example, classic/adaptive AUTOSAR, real-time (safety) POSIX (QNX, GHS, VxWorks, PikeOS) and non-real-time (for example, Linux). Typically, a combination of security-certified pC SoC such as Infineon TriCore, MPC57x/SPC58x or Renesas RH850 with application processors such as NXP S32V, S32G, Xilinix Zynq Ultrascale, Renesas R-Car family or Intel x86. In the automotive industry, the focus may be, in particular, on autonomous driving applications, chassis applications, engine control, gateway, body applications, and/or multimedia. The described system may, however, also be used in industrial automation or in transportation systems.

What is claimed is:

1. A method for providing a security execution environment for security-relevant, domain-specific applications in a virtualized system, the method comprising:
   sharing by at least two virtual machines a hardware level that is virtualized using a hypervisor; and
   providing a middleware level between the hardware level and an application level;
   wherein:
      the middleware level is software that:
         provides for a security domain of the security execution environment, which security domain is implemented on one of the virtual machines, the following:
            at least one driver to at least one security-relevant, domain-specific application that is on the application level and is dedicated for use by the security domain; and
            management of access by the security domain to hardware components of the hardware level, which hardware components are shared for use by at least one domain other than the security domain, which at least one domain is of at least one further execution environment for executing at least one further domain-specific application; and
         provides the at least one domain other than the security domain management of access to the shared hardware components of the hardware level;
      the security domain is configured to meet safety requirements and security requirements; and
      the security domain and the at least one other domain are formed by a division of a plurality of functions into function groups that are each assigned to a respective one of the domains, the division being performed according to Automotive Safety Integrity Level (ASIL) risk level categorization of at least a subset of the functions, such that at least those of the functions that are categorized by a highest risk level of the ASIL risk level categorization are all grouped into the security domain.

2. The method as recited in claim 1, wherein a temporal execution of processes and/or tasks of the security domain is planned using scheduling.

3. The method as recited in claim 1, wherein a planning of a temporal execution of security-relevant tasks and/or security-relevant processes of the security domain takes place in a task-based and/or process-based manner.

4. The method as recited claim 1, wherein the security domain accesses both security-related hardware resources and non-security-related, performance-related, hardware resources of the hardware level.

5. The method as recited in claim 1, wherein the security domain is operated on a separate hardware platform of the hardware level than all of the other domains.

6. The method as recited in claim 1, wherein the security domain is operated on a separate hardware unit of a hardware platform of the hardware level, a further domain being operated on a further hardware unit of the hardware platform.

7. The method as recited in claim 1, wherein the security domain is operated on a hardware unit of a hardware platform of the hardware level, and a further domain is operated on the same hardware unit of the hardware platform.

8. The method as recited in claim 1, wherein the security domain is provided together with at least one further domain.

9. The method as recited in claim 1, wherein the security domain is operated on a separate hardware chip than all of the other domains.

10. A hardware system comprising:
    a plurality of hardware components, wherein a middleware, which is run on the hardware system, provides to a security domain that (I) is virtualized by a hypervisor on a virtual machine of the hardware system and (II) includes an operating system running in a cell of the hypervisor, interfaces to the hardware components, drivers for exclusive use of security-relevant applications executable with the hardware components, and interfaces for domain-wide applications, wherein the security-relevant applications are not usable by other domains provided by the middleware, and wherein the security domain and the at least one other domain are by a division of a plurality of functions into function groups that are each assigned to a respective one of the domains, the division being performed according to Automotive Safety Integrity Level (ASIL) risk level categorization of at least a subset of the functions, such that at least those of the functions that are categorized by a highest risk level of the ASIL risk level categorization are all grouped into the security domain.

11. A control system for a motor vehicle comprising:
    a hardware system comprising a plurality of hardware components;
    wherein:
       a middleware level is provided between a hardware level defining an arrangement of the plurality of hardware components and an application level of applications that can be executed using the plurality of hardware components;
       at least two virtual machines of the hardware level, which share access to the hardware components, are virtualized using a hypervisor; and the middleware level is software that:

provides for a security domain of a security execution environment, which security domain is implemented virtualized on one of the virtual machines, the following:

at least one driver to at least one security-relevant, domain-specific application that is on the application level and is dedicated for use by the security domain; and management of access by the security domain to hardware components of the hardware level, which hardware components are shared for use by at least one domain other than the security domain, which at least one domain is of at least one further execution environment for executing at least one further domain-specific application; and provides the at least one domain other than the security domain management of access to the shared hardware components of the hardware level; and the security domain and the at least one other domain are formed by a division of a plurality of functions into function groups that are each assigned to a respective one of the domains, the division being performed according to Automotive Safety Integrity Level (ASIL) risk level categorization of at least a subset of the functions, such that at least those of the functions that are categorized by a highest risk level of the ASIL risk level categorization are all grouped into the security domain.

12. The system as recited in claim 11, wherein the security domain and/or the at least one further domain includes interfaces for domain-wide communication.

* * * * *